No. 725,200. PATENTED APR 14, 1903.
J. B. BARTHOLOMEW.
CULTIVATOR.
APPLICATION FILED APR. 15, 1902.
NO MODEL. 3 SHEETS—SHEET 3.
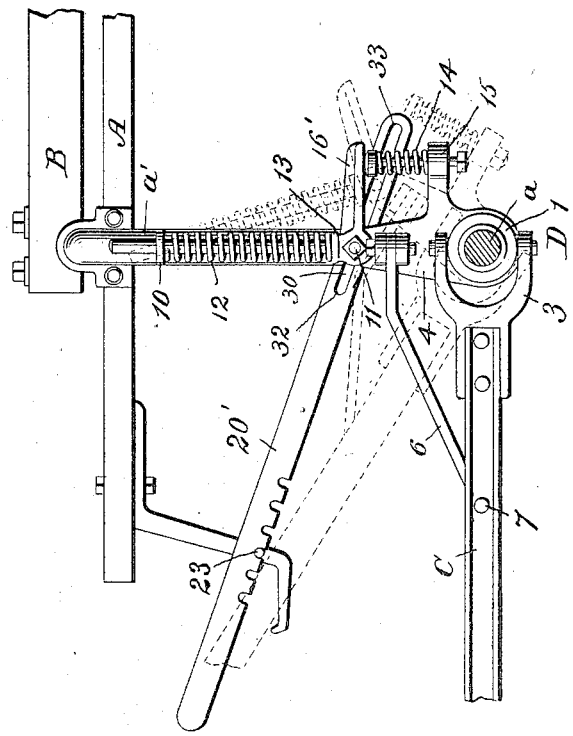
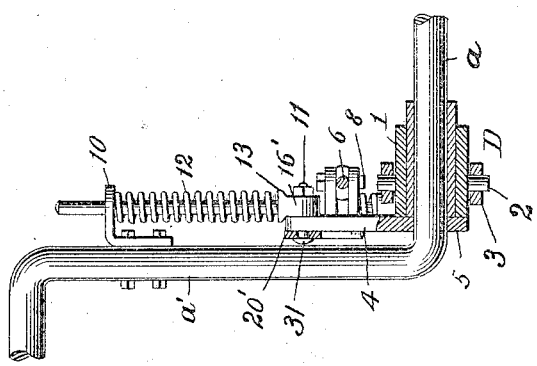
Witnesses
E. P. Alexander
A. K. Williams Jr.
Inventor
John B. Bartholomew
by N. N. Bliss
Attorney

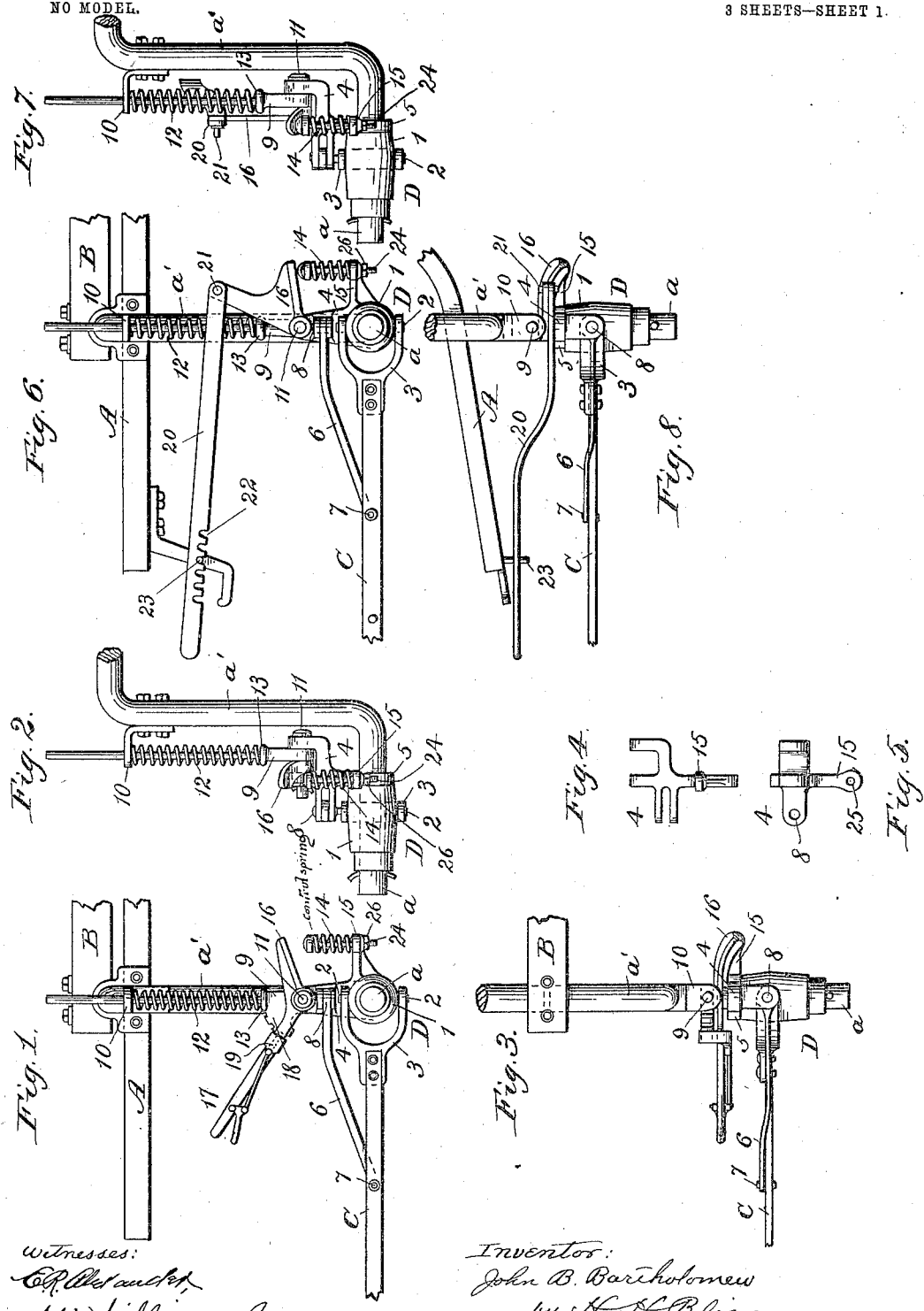

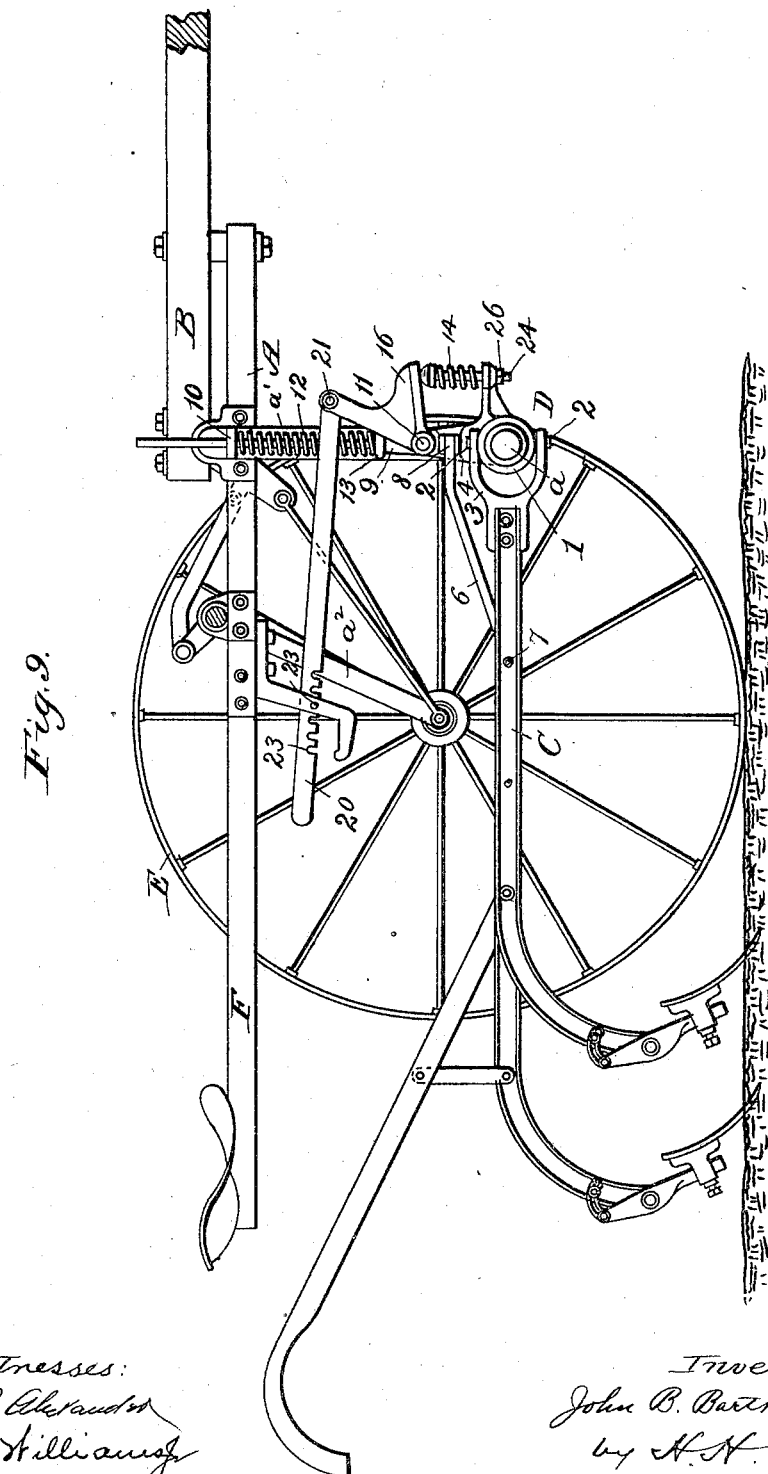

UNITED STATES PATENT OFFICE.

JOHN B. BARTHOLOMEW, OF PEORIA, ILLINOIS, ASSIGNOR TO AVERY MANUFACTURING COMPANY, OF PEORIA, ILLINOIS, A CORPORATION OF ILLINOIS.

CULTIVATOR.

SPECIFICATION forming part of Letters Patent No. 725,200, dated April 14, 1903.

Application filed April 15, 1902. Serial No. 103,027. (No model.)

*To all whom it may concern:*

Be it known that I, JOHN B. BARTHOLOMEW, a citizen of the United States, residing at Peoria, in the county of Peoria and State of Illinois, have invented certain new and useful Improvements in Cultivators, of which the following is a specification, reference being had therein to the accompanying drawings.

This invention relates to improvements in farm implements of the shovel class—that is to say, those having one or more series of shovels or those of each series being supported upon a beam or bar, which can be swung vertically or horizontally.

The object is to provide machines of this sort with devices of such nature that the shovel bars or beams can be easily lifted from a working position to a carrying position, or vice versa, by devices by which also the beams or bars can be readily controlled when in or near the working lines.

Figure 1 of the accompanying drawings is a side elevation of a portion of the shovel mechanism, showing my improvements. Fig. 2 is a front view of a part thereof. Fig. 3 is a plan view of the same. Figs. 4 and 5 are detailed views showing the arm detached. Fig. 6 is a side view of a modified form of the machine. Fig. 7 is a front view. Fig. 8 is a plan view of the same. Fig. 9 is a side view of a cultivator embodying my invention in the form shown in Figs. 6, 7, and 8. Figs. 10 and 11 illustrate by a side view and a rear view, partly in section, another form of shovel-controlling mechanism embodying my invention.

Referring to the drawings, A is the main frame of the cultivator or like implement; B, the tongue or draft device; C, the plow-beam, (of which there may be any desired or practicable number,) having a coupling D with the spindle $a$ of the arch $a'$ of the main frame, whereby the beam may swing vertically and laterally, and E the wheels carried by the arch $a^2$ of the main frame. Though not necessary to the working of my invention hereinafter described it is preferred that the wheels be longitudinally adjustable by the swinging of the arch $a^2$, actuated by the seat-support F and suitable connections, as described in my Patent No. 701,007, dated May 27, 1902.

The coupling D comprises a sleeve or pipe box 1, adapted to turn on the spindle $a$ and having a substantially vertical axis for the horizontal swinging of the beam. This axis is furnished by pins 2, pivotally engaged by a yoke 3, attached to the forward end of the plow-beam.

For the efficient operation of the machine it is desirable to provide a spring-lift to raise, or aid in raising, the plow-beam to inoperative position, and also a spring control for regulating the beam when in its working position to maintain the desired average depth of cultivation under various conditions. I am aware that devices of this general description have been heretofore proposed, as in Letters Patent No. 257,228 of E. P. Lynch, dated May 2, 1882, and in others; but it is the object of my present invention by material improvements in the organization and construction of the beam lifting and controlling devices to render the machine much more efficient and convenient in operation.

The beam is turned on its horizontal axis $a$ for lifting to inoperative position by means independent of the coupling D. Such means comprise an arm 4, mounted by a bearing 5 on the spindle $a$; a connection or link 6, pivoted to the beam at 7 at some distance from the coupling D and to a portion of the arm 4 at 8; a second arm 9, connected with the frame by suitable guiding means 10, such as an eye in which the upper part of the arm may slide; a knuckle-joint 11, connecting said arms 4 and 9, and a spring 12, acting between a part of the frame, such as said guiding means 10, and the arm 9, which has a shoulder 13 for the purpose to turn with said arms and flex the joint at 11. This movement acts to draw the connection 6 forward and lift the beam, but does not affect the coupling D, except as the latter is operated by the beam. To allow the beam to turn freely in horizontal planes on the vertical axis through the pins 2, unaffected by gravity and as little as possible by friction, the axis of the pivot at 8 is in line with said axis of the coupling at 2.

14 is the beam control-spring for acting on the beam when the latter is in working position to cause an upward pressure on the same. It is arranged to act between a part connected with the beam, such as an extension 15 of the arm 4, which is connected with the beam through the link 6, and a lever-like spring controlling device 16, constituting an abutment for the control-spring. This part 16 is pivotally mounted on one of the arms 4 or 9, which is attained, in effect, by giving the device 16 a fulcrum on the pivot of the knuckle at 11, as shown. The controlling device 16 is adjustable to vary the pressure and working efficiency of the spring 14 and has means for holding it in the desired position. Such means may be of various descriptions. To properly hold the part 16 when adjusted, it should have a connection with the main frame. In Fig. 1 it has an operating-handle 17, adapted to be locked with the arm 9 by a toothed segment 18 and latch 19, its connection with the frame being through the media of the parts 9 and 10. In Fig. 6 the device 16 has a handle or link 20 pivoted to it at 21 and engaging by notches 22 a pin 23, the latter being fixed on a part of the main frame. The devices 20 and 17 are so situated as to enable the pressure of the beam control-spring 14 to be adjusted from time to time by the user of the machine in his operating position while the plow is at work, thereby determining the depth of cultivation.

Various means may be employed for holding the control-spring in position to become active when the plow-beam assumes its working position. For this purpose I have shown a guiding-bolt 24 passing down through the coil of the spring 14 and loosely through an eye 25 in the extension 15. A nut 26 on the lower end of the bolt confines the latter and the spring and serves by its adjustment on the bolt to determine the initial or minimum tension of the control-spring. When the beam is lifted, the bolt 24 and spring 14 separate from the abutment at 16, and the control-spring becomes inactive. When the beam is in working position, the pressure of the spring 12 is in line with the joints at 10, 11, and a, and the force of the lifting-spring is neutralized, and it becomes substantially inactive. The action of the control-spring overcoming that part of the weight of the beam which is otherwise unsustained is to maintain the lifting-spring and its connections in its substantially neutral position. When for any reason the rear part of the beam C tends to sink downward, the extension 15 is elevated through the parts 6 and 4, moving the spring 14 upward. At the same time the accompanying backward movement of the joint 11 relative to the fastening device of the abutment 16 depresses the forward part or toe of the abutment to meet and compress the spring. Such downward tendency of the beam is thus quickly and yieldingly neutralized. A forward adjustment by the operator of the handle 17 or 20 causes the beam to be sustained by the control-spring sooner or at a higher point, and vice versa.

In Figs. 10 and 11 the arm 4 is independent of the coupling D, as already described. The abutment or controlling device at 16' is, however, made rigid with the arm 9. It is manually controlled or limited by a handle 20', engaging a pin 23 on the frame and having a slot 30, which embraces an extension of the knuckle-pivot at 31. By adjusting the handle 20' forward the rear end 32 of the slot becomes a stop to limit the compression of the control-spring 14 and the depth to which the shovels will work. If the handle be adjusted rearward, the front end 33 of the slot will act as a stop to limit the expansion of the spring 14 and the working height to which the shovels will rise.

What I claim is—

1. In a cultivator, or similar implement, the combination of the main frame, the plow-beam disposed to swing vertically, the lifting-spring and the supplemental control-spring, both arranged to act upon the beam at the forward end thereof independently of the lateral swinging of the beam, and means for varying the efficiency of the control-spring when the beam is in working position, substantially as set forth.

2. In a cultivator or similar implement, the combination of the main frame, the plow-beam coupled thereto to swing vertically, a lifting-spring for raising the beam from working position, a supplemental control-spring acting on the beam at the forward end thereof independently of the beam-coupling to regulate the beam, and manually-controlled means for varying the efficiency of said supplemental spring while the beam is in working position.

3. The combination of the main frame, the plow-beam, a coupling connecting the beam and frame whereby the beam may swing vertically, the control-spring independent of said coupling and acting to regulate the beam at the forward end thereof when the latter is in working position, and a manual spring-controlling mechanism for varying the efficiency of said spring while the beam is in working position.

4. In a cultivator or like implement, the combination of the main frame, the plow-beam, a coupling connecting the beam and frame whereby the beam may swing vertically, and a manually-controlled compression control-spring forward of the axis of said coupling and acting independently of said coupling to regulate the beam in working position.

5. In a cultivator or like implement, the combination of the main frame, the plow-beam, a coupling connecting the beam and frame whereby the beam may swing vertically, and a manually-controlled compression control-spring acting independently of said coupling to regulate the beam in working position and inactive when the beam is elevated, said spring having means extending within reach of the normal position of the operator for adjusting its operative tension.

6. In a cultivator or like implement, the combination of the main frame, the plow-beam, a coupling connecting the beam and frame whereby the beam may swing vertically, a control-spring for regulating the beam in working position, an abutment for said spring connected with the frame, another abutment for said spring connected with the beam independently of said coupling, and means for manually adjusting one of said abutments while the beam is in working position to vary the efficiency of said spring.

7. In a cultivator or like implement, the combination of the main frame, the plow-beam, a coupling having substantially horizontal and vertical axes connecting the beam and frame whereby the beam may swing vertically and laterally, a lifting-spring, and a connection between the spring and beam independent of said coupling, said connection having a vertical pivot in the line of the vertical axis of the coupling.

8. In a cultivator or like implement, the combination of the main frame, the plow-beam, a coupling having substantially horizontal and vertical axes connecting the beam and frame whereby the beam may swing vertically and laterally, a lifting-spring, a connection between the spring and beam independent of said coupling, said connection having a vertical pivot in the line of the vertical axis of the coupling, and a supplemental control-spring acting to regulate the beam in working position.

9. In a cultivator or like implement, the combination of the main frame, the plow-beam, a coupling connecting the beam and frame whereby the beam may swing vertically, a control-spring acting at the forward end of the beam independently of said coupling to regulate the beam in working position and inactive when the beam is elevated, and a lever for varying the efficiency of said spring.

10. In a cultivator or like implement, the combination of the main frame, the plow-beam, a coupling connecting the beam and frame whereby the beam may swing vertically, a control-spring acting at the forward end of the beam independently of said coupling to regulate the beam in working position, an abutment for said spring and a lever for adjusting said abutment.

11. In a cultivator or like implement, the combination of the main frame, the plow-beam having a pivoted connection with the frame whereby it may swing vertically, an arm connected with the beam, a spring acting on said arm to cause an upward pressure on the beam, a second arm pivotally connected with the first arm, means for holding said second arm in desired position, and a control-spring acting between said second arm and a part connected with the beam to cause an upward pressure on the beam in working position.

12. In a cultivator or like implement, the combination of the main frame, the plow-beam, a coupling connecting the beam and frame and having substantially horizontal and vertical axes whereby the beam may swing vertically and laterally, an arm having a connection with the beam independent of said coupling, and a spring exerting pressure on said arm to cause an upward pressure on the beam, said connection having a vertical pivot in line with the vertical axis of the coupling.

13. In a cultivator or like implement, the combination of the main frame, the plow-beam, a coupling connecting the beam and frame whereby the beam may swing vertically, an arm swinging with the beam, a spring controlling device connected with said arm and with the frame, and a beam control-spring acting between said device and a part connected with the beam to regulate the beam in working position, and means for holding said device in desired position.

14. In a cultivator or like implement, the combination of the main frame, the plow-beam, a coupling connecting the beam and frame whereby the beam may swing vertically thereon, a control-spring acting to regulate the beam in working position, a lever-like spring controlling device having a fulcrum near said coupling and independent thereof and adapted to vary the efficiency of said spring, and means whereby said spring controlling device has a locking connection with the frame to hold the former in desired position.

15. In a cultivator or like implement, the combination of the main frame, the plow-beam pivotally coupled therewith, an arm independent of the beam-coupling swinging with the beam, a second arm connected with the frame and having a knuckle-joint with said swinging arm, a lever-like spring-controlling device pivoted on one of said arms, and a control-spring acting between said lever-like device and a part connected with the beam to regulate the latter in working position.

16. The combination of the main frame, the plow-beam pivotally coupled therewith, an arm swinging with the beam, a second arm connected with the frame and having a knuckle-joint with said swinging arm, a lever-like spring controlling device pivoted on one of said arms, a control-spring acting between said lever-like device and a part connected with the beam to regulate the latter in working position, and means for locking said lever-like device in desired position with the arm on which it is mounted.

17. The combination with the beam, of the arm 4, the connection 6, the arm 9, the abutment 16 pivotally supported at 11, the control-spring acting between the abutment and a part connected with the beam, and means for adjusting the abutment.

18. In a cultivator or like implement, the combination of the main frame, the plow-beam coupled therewith to swing vertically and to swing freely and directly in planes from side to side, spring-power mechanism connected with said beam for lifting the same and controlling it in working position, and means extending within reach of the normal position of the driver and manually operable by the driver while the plows are in action for adjusting independently of the beam the efficiency of the spring-power which controls the working position of the beam.

In testimony whereof I affix my signature in presence of two witnesses.

JOHN B. BARTHOLOMEW.

Witnesses:
ELVAN M. VOORHEES,
ALBERT L. GREGORY.